April 26, 1960  P. STARTZELL  2,933,759
APPARATUS FOR STRETCHING PLASTIC
Filed Oct. 16, 1956  5 Sheets-Sheet 1

INVENTOR
Paul Startzell
BY Oscar L. Spencer
ATTORNEY

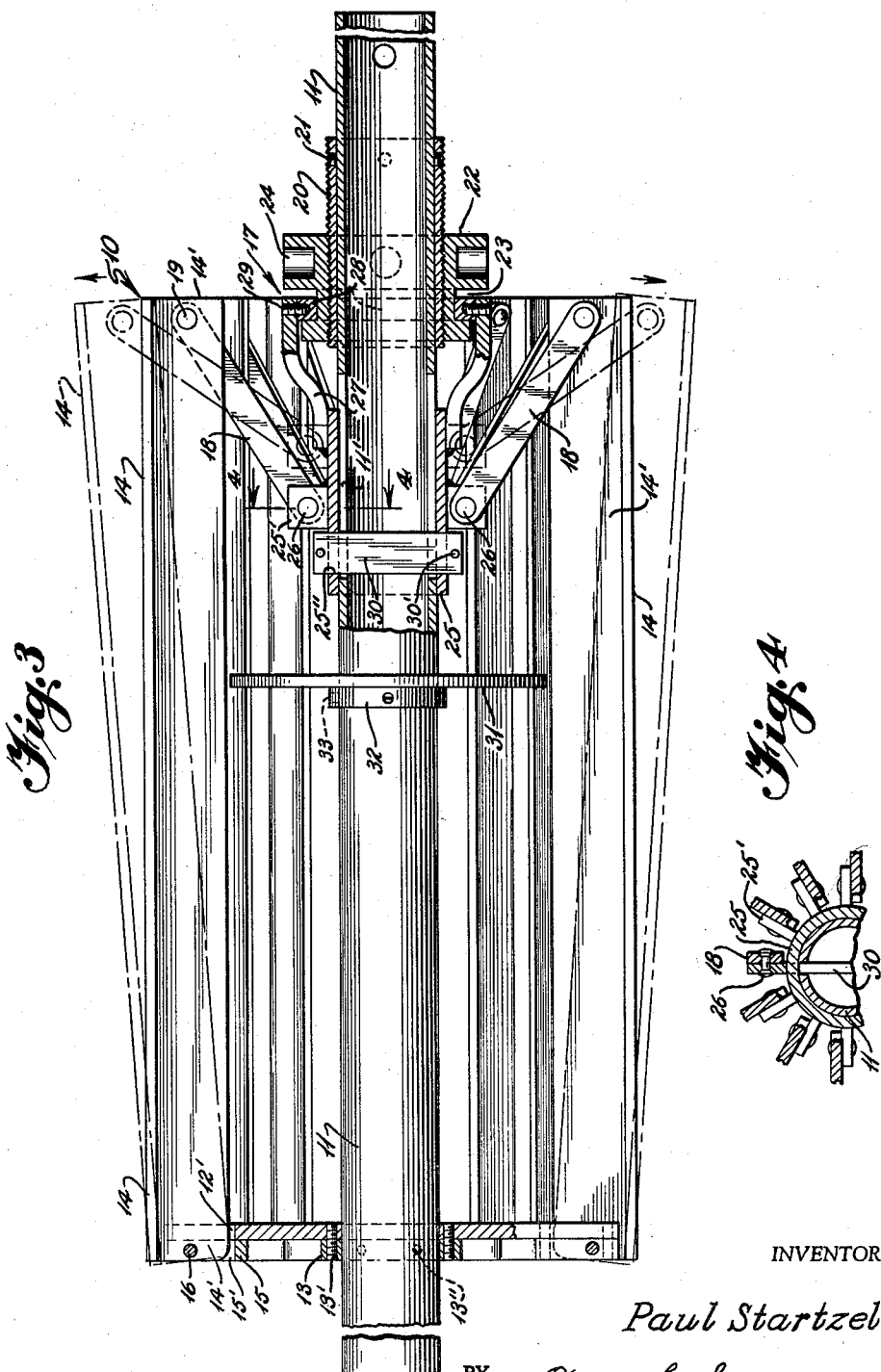

April 26, 1960 P. STARTZELL 2,933,759
APPARATUS FOR STRETCHING PLASTIC
Filed Oct. 16, 1956 5 Sheets-Sheet 3

INVENTOR
Paul Startzell
BY Oscar L. Spencer
ATTORNEY

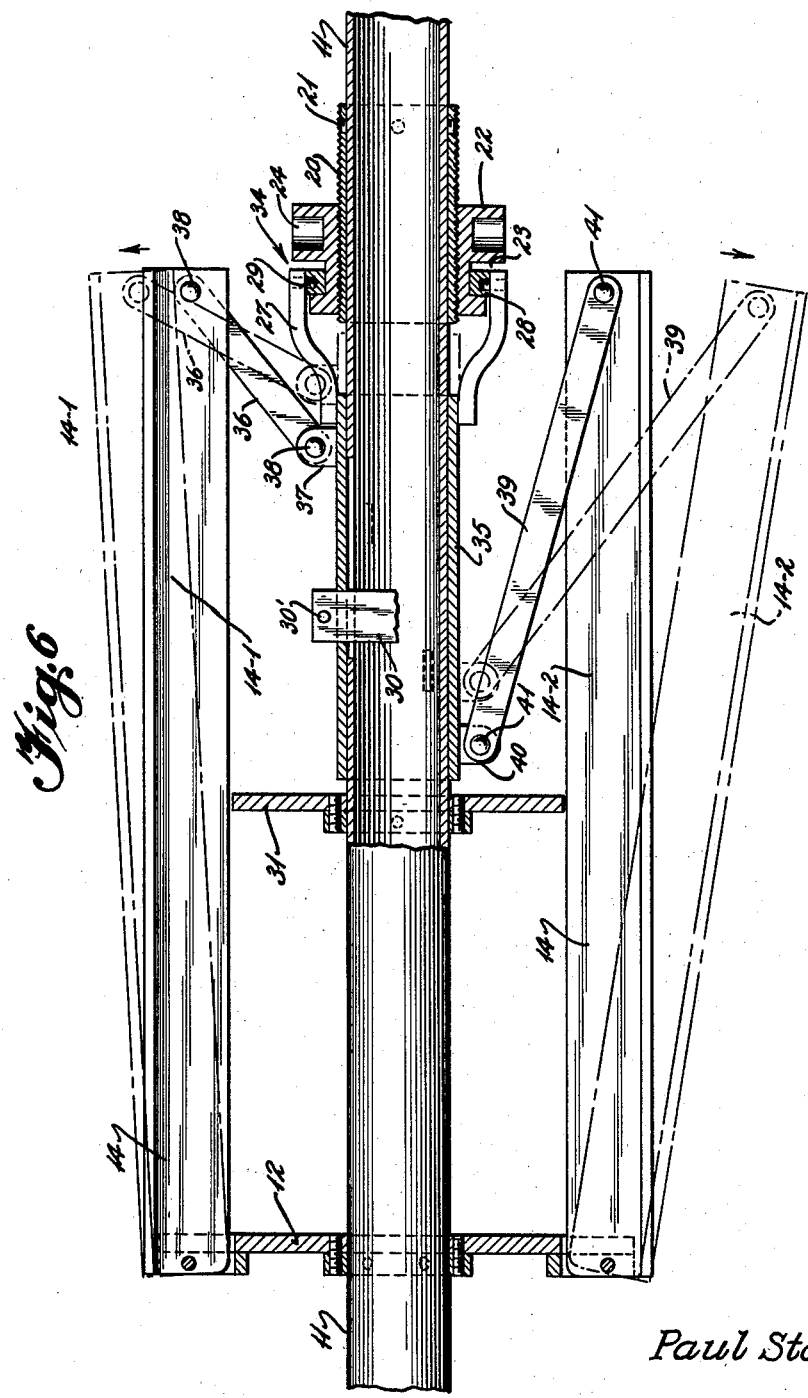

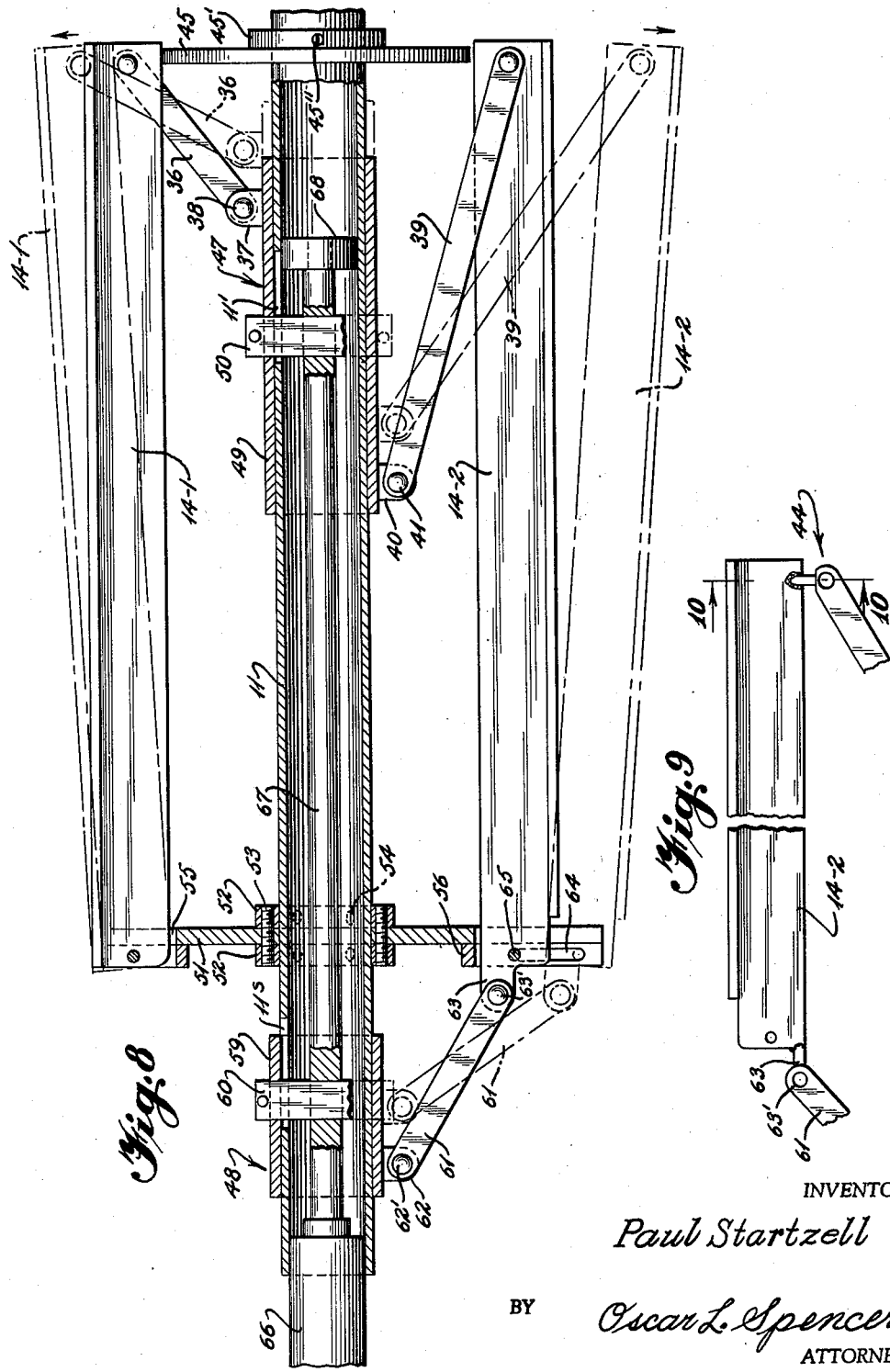

United States Patent Office 2,933,759
Patented Apr. 26, 1960

2,933,759

APPARATUS FOR STRETCHING PLASTIC

Paul Startzell, Greensburg, Pa., assignor to Pittsburgh Plate Glass Company, Allegheny County, Pa., a corporation of Pennsylvania Application October 16, 1956, Serial No. 616,262

10 Claims. (Cl. 18—1)

My invention is directed to improved apparatus for shaping the plastic interlayer used in laminated windshields or like panels of laminated safety glass.

Modern-day automobiles utilize laminated glass for windshields which extend across the body, incline backwardly at a marked angle to the vertical and have sharply bent end portions projecting rearwardly and in some cases somewhat downwardly at each end. These windshields are known as the so-called "wrap-around" type of windshield.

It is customary in some windshields to build a shade therein by forming the interlayer of synthetic resinous sheet with a colored strip (usually green) along the upper edge to provide the finished windshield with a tinted portion for the general improvement of visual conditions for the driver.

It is usually desirable that the colored strip portion should extend approximately horizontally along the top portion of the windshield. Thus the lower edge of the colored or tinted strip should extend generally horizontally when the windshield is installed as when the front, across body portion, inclines upwardly and backwardly while the bent-around ends have upper edges which dip sharply downwards. To have the bottom of the colored strip portion in the windshield in installed position extending generally horizontally necessitates such strip being somewhat curved with its ends turned away from the glass when the windshield is laid flat, as it is during certain stages of its fabrication.

The bending of the pair of glass sheets making up a laminated windshield is well known to be carried out on concave or convex molds while passing through an oven. In carrying out the fabrication the sheets of formed glass are temporarily separated to permit insertion of the plastic or vinal sheet (plasticized polyvinyl acetal, such as plasticized polyvinyl butyral as presently used). Following this an initial pressing operation takes place in which the composite laminated assembly is passed between a pair of nipper rolls and the edges are trimmed, and a final high pressure stage in which the sheet assembly is subjected to elevated temperature and pressure for the purpose of sealing the union between the laminations and finally curing the plastic material to render it transparent.

The apparatus according to the present invention is utilized in an advantageous manner in placing the proper curvature in the sheeting from which is cut to shape in outline the interlayer plastic pieces which, as above pointed out, are inserted between the formed glass sheets.

An object of my invention is to provide a forming apparatus for applying proper curvature to plastic sheets used as interlayers in laminated glass structures.

Another object of my invention is to provide stretching apparatus for plastic sheeting which imparts the proper curvature so that the lower boundary line of a tinted edge section therein will appear generally horizontal when a laminated windshield in which the sheet is utilized is in installed position.

A further object of my invention is to provide a shaping apparatus for interlayer sheeting for laminated structures which imparts the shaping without leaving an imperfect or pimpled surface on the sheeting during the stretching or forming.

A still further object of my invention is to provide shaping apparatus for interlayer sheeting which imparts to the sheeting longitudinal sections having at one crosswise edge area a generally large radius of curvature which when installed in a windshield in an automobile has a generally horizontal attitude with portions adjacent each end of the large radius of curvature sections which have shorter radius of curvature as is necessary for the bent back end wings of so-called "wrap-around" windshields.

Yet a further object of my invention is to provide forming apparatus for sheeting used as interlayers of laminated structures which in addition to the immediately foregoing structure will impart to the sheeting corresponding but proportional curvatures at the opposite crosswise edge areas whereby such sheeting in forming on the apparatus takes a general ellipsoidal shape resembling that of an ellipsoid.

Still further objects and the entire scope of applicability of the present invention will become apparent from the detailed description given hereinafter. It should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

For a more complete understanding of the nature and scope of my invention, reference can be had to the following detailed description taken in connection with the accompanying drawings in which;

Fig. 3 is a cross sectional view along line 3—3 of Fig. 1 without sheeting wound thereon showing in full line the cylindrical position of the apparatus and in broken line in expanded position for stretching sheeting;

Fig. 4 is a partial cross section view along line 4—4 of Fig. 3 showing the pivotal attachment of the inner ends of the expanding links;

Fig. 6 is a sectional view along line 6—6 of Fig. 5 layed out in the plane of the paper showing in broken line the expanded position of the shaping apparatus;

Fig. 8 is a sectional view along line 8—8 of Fig. 7 layed out in the plane of the paper showing in broken line the expanded position of the shaping apparatus according to the second modification;

Fig. 9 is a broken away detail of one of the longitudinal T-shape in cross section members of Fig. 7.

Throughout the description like reference characters refer to similar parts.

Figure 1:
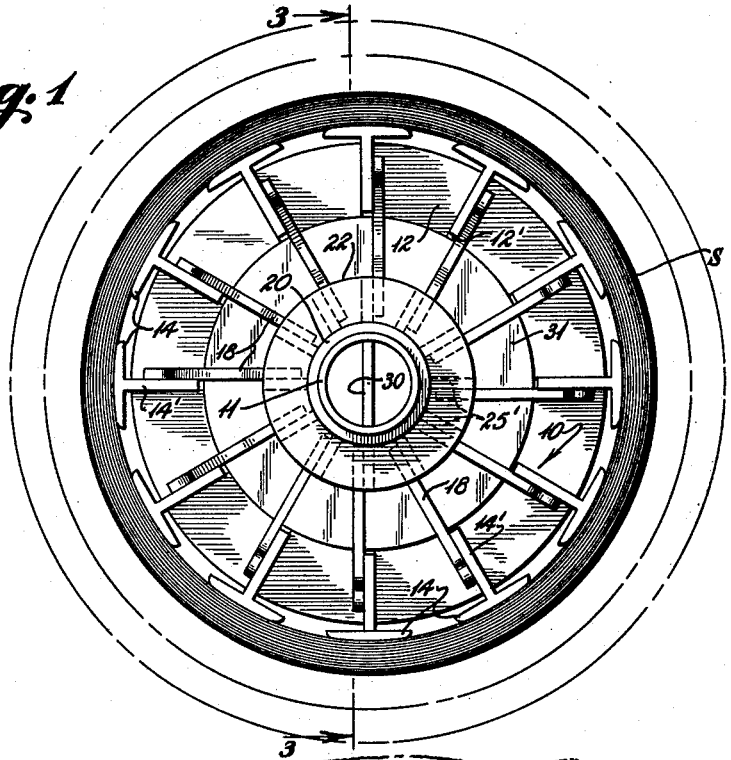
Fig. 1 is a right hand end view of the shaping apparatus in Fig. 3 in unexpanded cylindrical position.
Figure 2:
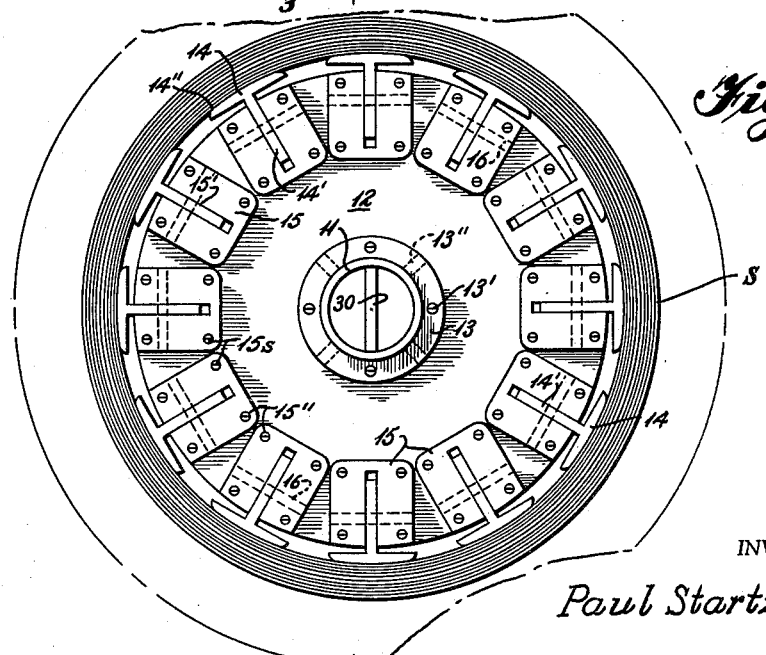
Fig. 2 is a left hand end view of the apparatus in Fig. 3.

An expansible frame is generally indicated at 10 in Figures 1, 2 and 3 and is mounted for rotary movement on an axial shaft 11 which may be of tubular metal stock such as aluminum as may be the other parts. A disc 12 is apertured at its center and is received over shaft 11. Affixed to disc 12 as by screws 13' is an apertured fastener plate 13 which is set in adjusted position along shaft 11 by set screws 13". Radial slots 12' are cut into the edge of disc or circular plate to receive the stem 14' of longitudinal, T-shaped in cross section, member 14. Attached to the end plate 12 are pads 15 having slots 15' therein in alignment with the slots 12' in plate 12 to receive the stems 14' of the longitudinal members 14 which are pivotally attached to pads 15 by pivot pins 16. Pads 15 may be attached to the plate 12 as by rivets or bolts 15s which are received in suitable apertures 15" that align with suitable apertures formed in plate 12.

The longitudinal members 14 have their cap or head portion cut or formed with a transversely convex outer surface 14" to receive plastic sheeting that is wound thereon.

A hub assembly generally indicated at 17 is slidably mounted on shaft 11 by suitable means to be described. This hub assembly 17 has pivotally attached thereto links 18 which extend radially outward therefrom to the other ends of the longitudinal members 14 where they are pivotally attached by pivot pins 19.

The hub assembly 17 will now be described. An externally threaded sleeve 20 is slidably received on shaft 11 where it is fixed in selected position by set screws 21. Threadedly received on the external threaded sleeve 20 is a nut 22 having formed therein an annular recess 23 and wrench receiving radial spaced recesses 24 such as may receive a spanner type wrench. Slidably mounted on shaft 11 and inboard of and in spaced relation to nut 22 is a second sleeve 25 having spaced apart radial lugs 25' which are apertured to receive pivot connecting pins 26 that connect the links 18 to the second sleeve 25 of the hub assembly. Finger members 27 which extend longitudinally have one of their ends affixed to the second sleeve 25 as by welding and their other end secured to a split ring 28 as by screws 29.

In putting the apparatus together, the link assembly 17 is slid into position on shaft 11 by slipping on second sleeve 25 and then externally threaded sleeve 20 until sleeve 20 is adjacent the link end of longitudinal members 14 after which it is secured to shaft 11 by set screws 21. A spanner wrench is used to position nut 22 on the threaded sleeve 20 so that the longitudinal members 14 form together a cylindrical framework on which is wound, plastic sheetings to be stretched, see Figures 1 and 2. To prevent hub assembly 17 from rotating on hollow shaft 11, the shaft is longitudinally slotted at 11' to receive a transverse bar 30 which extends through suitable apertures 25" in second sleeve 25. Pins 30' at each end of the bar 30 hold it in place.

Fig. 3 shows also an intermediate supporting disc 31 having a central aperture so that it is slipped over the shaft 11 and secured by a plate 32 and set screws 33.

*Modification No. 1*

Figure 5:
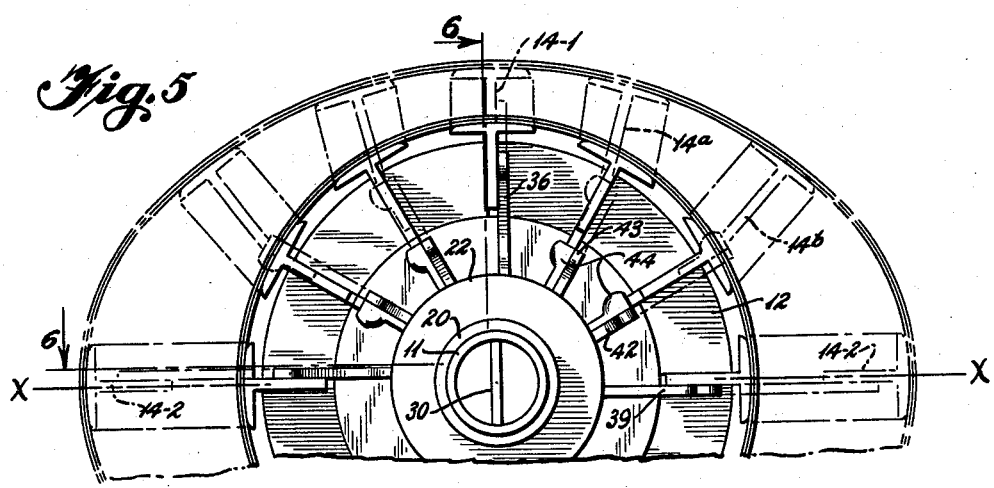
Fig. 5 is a right hand end view of a modified form of expanding apparatus shown in Fig. 6 wherein the expanding end may expand from a circular cross section to an elliptical cross section.

In Figures 5 and 6 there is shown a modified form that the stretching apparatus may take wherein the longitudinal T-shape in cross section members 14 are designated as a pair of oppositely disposed members 14—1, a pair of oppositely disposed members 14—2 positioned at right angles to members 14—1, and intermediate members 14a and 14b between each member 14—1 and member 14—2. Members 14—1, 14—2, 14a and 14b in their expanded position assume at their smaller end a circular peripheral shape while at their larger expanded end an elliptical peripheral shape as shown in Fig. 5. The mechanism is like that in Figures 1, 2 and 3 except the hub assembly 34 is modified.

Figure 10:
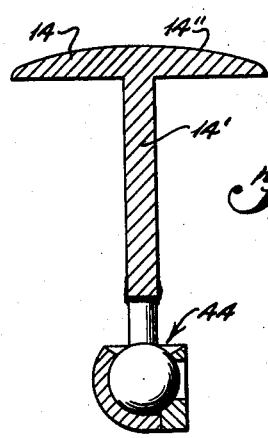
Fig. 10 is an enlarged sectional view along line 10—10 of Fig. 9 showing one of the ball and socket joints as it appears in Figures 5 and 7.

The hub assembly 34 is made up of like parts to those of the hub assembly 17 in Figures 1, 2 and 3 except that the second sleeve 35 is much longer than sleeve 25 to accommodate increasing lengths of links. The pivotal connection of the intermediate longitudinal members 14a and 14b in each quarter sector to the second and slidable sleeve is by ball and socket joints such as shown in Fig. 10.

In Fig. 6 each of the short links 36 is pivotally connected to a lug 37 on sleeve 35 by a pin 38 at one end and is pivotally connected at the other end to one of members 14—1 by a pin 38. The lugs 37 are secured to the sleeve 35 toward the right hand end as shown in Fig. 6. The long links 39 are pivotally secured to the sleeve 35 at the left hand end by lugs 40 and pins 41 and are pivotally connected at the other end of links 39 to longitudinal members 14—2.

Reference to Fig. 5 shows the intermediate links 42 and 43 of increasing in length between short link 36 and long link 39. Instead of the usual type of lugs 37 and 40 use is made of ball and socket type joints 44 as shown in Fig. 10.

In operation the longitudinal members 14—1, 14—2, 14a and 14b about which the sheeting S is wound will twist a certain amount. However, if the length of the longitudinal members 14—1, 14—2, 14a and 14b with respect to their cross sectional size does not permit twist, ball and socket joints may likewise be used on other end connections of longitudinal members 14—1, 14—2, 14a and 14b, to end plate 12 at the smaller end of the expansible frame.

In Fig. 5 it will be noted that axis X—X divides the frame into two symmetrical halves. Sheeting would be wound on the contracted frame which would be cylindrical, then it would be placed in an oven and warmed until sufficiently yieldable. The frame is then expanded, as before, by turning nut 22 by a spanner wrench utilizing recesses 24. The intermediate longitudinal members 14a and 14b as shown in the section in Fig. 5 will assume the positions as shown in Fig. 5 in stretching the sheeting. The frame 10 with the sheeting S around it is again placed in the oven so that the sheeting S will become relaxed in the stretched condition.

It will be noted from Fig. 5 that the shape of the sheeting on the frame will approximate an ellipsoid shape. When the sheeting is cut along the axis X—X each half will furnish a formed blank from which an insert may be cut following a pattern. The tinted band of the sheeting to form the shaded portion of the insert will be at the smaller end of frame 10.

*Modification No. 2*

Figure 7:
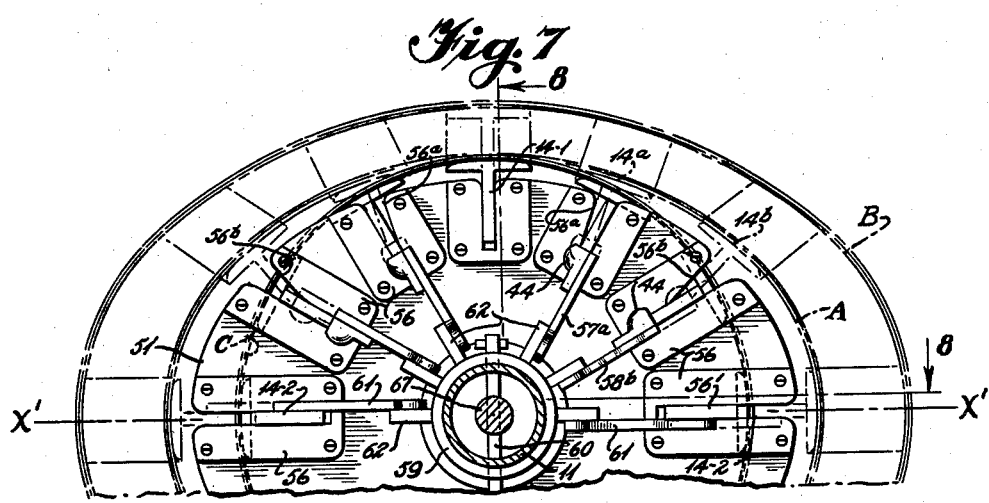
Fig. 7 is an end view of a further modified apparatus as viewed at the left end of Fig. 8.

An ellipsoidal shape approaching that of an ellipsoid may be obtained by the apparatus shown in Figures 7 and 8. The smaller end of the expansible frame is expandable from a circle C to that approaching an ellipse A as shown in Fig. 7. In some windshield assemblies this shaping of the blanks may be more desirable.

In Fig. 8 shaft 11 serves as the center of the expansible frame work. An end support disc 45 is affixed to shaft 11 by a collar 45' and set screws 45". This disc 45 serves as a support for the inward positioning of longitudinal members 14—1, 14—2, 14a and 14b. A first hub assembly is generally indicated at 47 at the right hand end of the frame in Fig. 8 while a second hub assembly 48 is indicated at the other end.

Hub assembly 47 includes a sleeve 49 slidably received over hollow shaft 11 which shaft is longitudinally slotted at 11' to receive a bar 50 extending transversely through suitable apertures cut into sleeve 49. Short and long links 36 and 39 similar to those in Figures 5 and 6 are secured by pivotal connections to the sleeve 49 as described heretofore for the assembly in Figures 5 and 6. Intermediate the links 36 and 39 for the respective longitudinal members 14—1 and 14—2 are intermediate links such as 42 and 43 for the intermediate longitudinal members 14a and 14b as shown in Figures 5 and 6. Like pivotal ball and socket connections are provided for links 42 and 43 as in Figures 5 and 6 heretofore described.

The smaller end of the expansible frame at the left hand end of Fig. 8 is supported by the end disc 51 which is slidably received over shaft 11 as was disc 12 in the construction of Fig. 3. The disc 51 is secured thereto by circular hub plates 52 connected by screws 53. The plates 52 are secured to shaft 11 by set screws 54. The disc 51 is slotted with radially extending slots 55 and pads 56 with slots 56' are secured to the disc by screws 57.

The slots 56a and 56b in intermediate pads 56 for the the intermediate links such as 57a and 58b respectively serves to guide the stems 14' of the respective T-shaped in cross section longitudinal members 14a and 14b.

Reference to Fig. 8 shows the second hub assembly 48 used to slidably expand the smaller end of the frame at the end plate 51. The hub assembly 48 has a sleeve 59 slipped over shaft 11 which is slotted at 11s to receive a bar 60 that extends through suitable slots in sleeve 59. The links 61 are connected to the sleeve 59 by lugs 62 and pins 62' and to a lug 63 on member 14—2 by a pin 63'. Each of pads 56 on disc 51 that guide longitudinal members 14—2 is provided with a transverse slot 64 and a pin 65 secured to the end of longitudinal member 14—2 extends into slot 64 so that pin 65 moves in slot 64 when that end of longitudinal member 14—2 moves toward or away from shaft 11. As sleeve 59 of the hub is slid to the right the end of member 14—2 moves radially outward and at the same time as the other end of member 14—2 is moved outward, the member 14—2 pivots about pin 65 as it moves radially outward.

Intermediate links 57a and 58b are pivotally connected to sleeve 59 by ball and socket joints 44. In their movement the intermediate longitudinal members 14a and 14b are guided by the slots 56a and 56b in their respective pads to assume the positions shown in Fig. 7. Ellipse A in Fig. 7 shows the expanded peripheral shape of the smaller end of the frame while ellipse B shows the shape at the larger end. The sheeting S on the frame will stretch to the ellipsoidal shape shown between A and B in Fig. 7. As before for the stretching of sheeting shown in Figures 5 and 6, the sheeting S on the frame in Figures 7 and 8 can be cut along axis X'—X' to form two identical blanks from which interlayers may be cut according to the pattern.

In the apparatus in Figures 7 and 8 use is made of an air or hydraulic cylinder for motive power to expand the frame. This may comprise a piston rod 66 of an air cylinder extending into shaft 11 as a cylinder. Piston rod 66 is connected to the sleeves 49 and 59 by piston rod extension 67 which is slotted to receive the keys 50 and 60. A guide member 68 of circular shape is attached to the right hand end of the rod 67 and guides same in hollow shaft 11.

It is readily seen that there has been provided apparatus by which interlayer sheeting may be formed with selected curvature to permit its fabrication in laminated structure of sheets having widely varying large and small or sharp radii of curvature. This apparatus lends itself to greatly speed up production in the proper shaping of interlayer sheets for laminated sheet structures and particularly "wrap-around" windshields for automobiles.

I claim as my invention:

1. Apparatus for stretching distortable plastic sheeting, to be cut into a number of interlayers for windshields, in a nonuniform manner with more stretch along one edge than along an opposite edge, which comprises a supporting structure having a longitudinal axis, several longitudinal members each having a transversely convex surface portion extending longitudinally, means connected to the supporting structure for supporting one end of each of said longitudinal members disposed radially about said longitudinal axis for pivotal movement of each of said one ends about an axis parallel to a plane normal to said longitudinal axis, means connected to the supporting structure for supporting the other end of each of said longitudinal members disposed radially about said longitudinal axis in a first position wherein said convex surface portions of said members in the first position extend longitudinally in parallel relationship to one another and constitutes a substantial portion of a cylindrical surface, and means operatively associated with at least one of said supporting means for said one ends and said other ends of said longitudinal members for moving away from said longitudinal axis each of said longitudinal members at said other end, said moving means and both of said supporting means being constructed and arranged with respect to one another to provide by said moving means a greater movement away from the longitudinal axis of each of said longitudinal members at said other end than at said one end, whereby said longitudinal members are pivotally moved from said first position to a second position wherein said convex surface portions extend longitudinally in nonparallel relationship to one another and constitute a portion of a noncylindrical surface enclosing a volume larger than that of said cylindrical surface and whereby said plastic sheeting wrapped around said members in the first position is stretched in said nonuniform manner by movement of said members to the second position, said supporting structure being constructed and arranged to permit said moving means to move at least said other ends of said longitudinal members from the first position to the second position.

2. The apparatus of claim 1 wherein each of said longitudinal members is T-shaped in cross section with a head portion of the T-shape and wherein said convex surface portion of the member is the outer surface of the head portion.

3. Apparatus for stretching distortable plastic sheeting, to be cut into a number of interlayers for windshields, in a nonuniform manner with more stretch along one edge than along an opposite edge, which comprises a shaft, a disc secured on said shaft, several longitudinal members each having a transversely convex surface portion extending longitudinally, means pivotally mounting each of said members at one end to said disc, a sleeve slidably mounted on said shaft, links each pivotally mounted at one end to said sleeve and at the other end pivotally connected to the other end of one of the longitudinal members, and means mounted on said shaft for axially moving said sleeve along said shaft to move said members by said links between a first position and a second position, said longitudinal members in said first position having said convex surface portions of said members extending longitudinally parallel to said shaft and constituting a substantial portion of a cylindrical surface and said longitudinal members moved by said links to the second position having their ends pivotally connected to said links farther from the shaft than the ends pivotally mounted to the disc, whereby said plastic sheeting wrapped around said members in the first position is stretched in said nonuniform manner by movement of said members to the second position by said links with axial movement of said sleeve.

4. The apparatus of claim 3 wherein each of said longitudinal members is T-shaped in cross section with a head portion of the T-shape and wherein said convex surface portion of the member is the outer surface of the head portion.

5. The apparatus of claim 4 wherein the means for pivotally mounting each of said members to the disc provide movement of said members about axes maintained in a plane normal to the shaft whereby the convex surface portions of the members in the second position constitute a portion of a surface of a truncated cone.

6. The apparatus of claim 5 wherein all of the links are of equal lengths whereby the convex surface portions of the members in the second position constitute a portion of a surface of a truncated right circular cone.

7. The apparatus of claim 6 wherein the means for axially moving said sleeve includes an externally threaded sleeve secured on said shaft, a nut having an annular peripheral groove on said externally threaded sleeve, and finger members disposed about the shaft and secured to the sleeve slidably mounted on the shaft, said finger members extending longitudinally into the annular groove of said nut, said apparatus further including means preventing rotary motion of said slidably mounted sleeve relative to said shaft.

8. The apparatus of claim 5 wherein the links comprise a pair of short links in a first plane, a pair of long links in a second plane normal to the first plane, and links between the short and long links of increasing length from the short link to the long link whereby the convex surface portions of the members in the second position constitute a portion of a surface of a solid that is circular at one end and elliptical at the other end.

9. The apparatus of claim 8 wherein the means for axially moving said sleeve includes an externally threaded sleeve secured on said shaft, a nut having an annular peripheral groove on said externally threaded sleeve, and finger members disposed about the shaft and secured to the sleeve slidably mounted on the shaft, said finger members extending longitudinally into the annular groove of said nut, said apparatus further including means preventing rotary motion of said slidably mounted sleeve relative to said shaft.

10. Apparatus for stretching distortable plastic sheeting, to be cut into a number of interlayers for windshields, in a nonuniform manner with more stretch along one edge than along an opposite edge, which comprises a shaft, a disc secured on said shaft and having equally spaced pairs of open-ended radial slots, the slots of each of said pairs being on the same diameter, several longitudinal members each having a T-shape in cross section with a head portion having a transversely convex outer surface portion extending longitudinally, brackets attached to said disc having slots in alignment with the slots in the disc, pins in the brackets and extending into the slots of the brackets, said members each pivotally mounted at one end by one of the pins, all but a pair of brackets in alignment with a pair of radial slots having slots for receiving the pins for movement of the pins radially of the shaft, said members pivotally mounted by said pins in slots for the radial movement having an extension beyond said brackets, a first sleeve and a second sleeve each slidably mounted on said shaft on opposite sides of said disc, links each pivotally connected at one end to said first sleeve and at the other end to the other end of one of the longitudinal members, said links comprising a pair of short links in a first plane, a pair of long links in the second plane normal to the first plane, and links between the short and long links of increasing length from the short link to the long link, all except said short links being pivotally connected to the members connected at the one end to the pins in the slots for radial movement, links each pivotally connected at one end to the second sleeve and at the other end to one of the members connected at the other end by links other than the short links, and means for axially moving said first and second sleeves simultaneously, whereby the longitudinal members are moved from a first position wherein the convex surface portions constitute a substantial portion of a cylindrical surface to a second position whereby the convex surface portions constitute a portion of the surface of a truncated elliptic cone.

References Cited in the file of this patent

UNITED STATES PATENTS

| 1,113,753 | Chambers | Oct. 13, 1914 |
| 2,603,580 | DiCicco et al. | July 15, 1952 |
| 2,678,175 | Wiig | May 11, 1954 |

FOREIGN PATENTS

| 207,689 | Great Britain | Dec. 6, 1923 |
| 1,123,841 | France | June 18, 1956 |